United States Patent [19]

Linss et al.

[11] Patent Number: 5,330,342

[45] Date of Patent: Jul. 19, 1994

[54] APPARATUS FOR AND METHOD OF MANUFACTURING OF PREFORMS HAVING A LONGITUDINAL WALL WITH A VARIABLE CROSS SECTION

[75] Inventors: Gerhard Linss; Karl-Friedrich Ossberger, both of Weissenburg, Fed. Rep. of Germany

[73] Assignee: Ossberger-Turbinenfabrik GmbH & Co., Weissenburg, Fed. Rep. of Germany

[21] Appl. No.: 979,144

[22] Filed: Nov. 20, 1992

[51] Int. Cl.$^5$ .................. B29C 49/04; B29C 49/28; B29C 49/78

[52] U.S. Cl. .................. 425/150; 425/529; 425/532; 425/533; 264/506; 264/539

[58] Field of Search .............. 264/40.5, 40.7, 40.1, 264/539, 506, 537, 541; 425/150, 532, 533, 529, 174.2

[56] References Cited

U.S. PATENT DOCUMENTS

| | | | |
|---|---|---|---|
| 3,008,192 | 11/1961 | Allen et al. | 264/539 |
| 3,019,480 | 2/1962 | Soubier | 264/541 |
| 3,795,719 | 3/1974 | Morecroft et al. | 264/541 |
| 4,188,179 | 2/1980 | Linss et al. | 264/539 |

FOREIGN PATENT DOCUMENTS

| | | | |
|---|---|---|---|
| 2152837 | 4/1973 | Fed. Rep. of Germany | 264/541 |
| 2426736 | 12/1975 | Fed. Rep. of Germany | 264/539 |
| 2528029 | 1/1977 | Fed. Rep. of Germany | 264/539 |
| 3306533 | 8/1984 | Fed. Rep. of Germany | 264/541 |

Primary Examiner—Catherine Timm
Attorney, Agent, or Firm—Akoo-Toren

[57] ABSTRACT

An apparatus for manufacturing a tube-like preform having a longitudinal wall with a variable cross-section for blow molding of a hollow body from a thermoplastic material, includes a tubular die having a variable exit opening, and a collar die having a recess and movable into engagement with and away from the tubular die, the preform being produced by ejecting of the thermoplastic material from the exit opening of the tubular die into the recess of the collar die while moving tubular die, with controlling a speed of movement of the collar die and a cross-section of the exit opening of the tubular die in such a manner that larger and smaller cross-section of the exit opening correspond to speed rate of the collar die, so that a thickness of the wall of the producible preform changes from peaks to valleys in a wavelike manner to form the variable cross-section of the wall.

7 Claims, 2 Drawing Sheets

APPARATUS FOR AND METHOD OF MANUFACTURING OF PREFORMS HAVING A LONGITUDINAL WALL WITH A VARIABLE CROSS SECTION

BACKGROUND OF THE INVENTION

The invention relates to an apparatus for manufacturing tube—like preforms having a variable cross-section along their length for blow—molding hollow bodies from a thermoplastic material, which apparatus comprises a tubular die and a collar die (injection molding die) having a recess into which plastic material is injected when the collar die sits on the tubular die, the preform being produced upon lifting of the collar die of the tubular die and moving collar die to its predetermined position above the tubular die. The apparatus further comprises a control device for a drive displacing the collar die toward and away from the tubular die, and a control device for a drive responsible for changing the size of the exit opening of the tubular die during movement of the collar die away from the tubular die. The speed of the collar die increases from zero up during away movement of the collar die. The control devices are actuated upon start of lifting of the collar die and effect a displacement dependent control.

An apparatus of this type is disclosed in German patent 2,426,730. This apparatus functions according to a PRESSBLOWER process. The control devices of this apparatus are provided with switches which are actuated by the liftable collar die. The preform produced in this apparatus has a wall with a stepwise cross-section. The wall thickness of the preforms in different regions has a different configuration, and the change in cross-section of the preform is produced in relatively little time. This known apparatus is poorly adapted for producing preform for bellows. This apparatus is not suited for producing preforms for bellows that should have a substantially constant wall thickness despite having numerous large pleats. This requires practically not attainable large number of switches. It is also known, from German patent 2,426,736, to control switches of the control device of such an apparatus, which switches are arranged along the displacement path of the collar die, by an electronic prearranged program, If such a program is made time-dependent, then frequent changes in wall thickness, necessary for producing a preform for a bellows, cannot be effected with a necessary precision, because conformity between respective positions of the collar die cannot be achieved with sufficient precision.

Accordingly, the main object of the invention is an improved apparatus of the above-mentioned type which would make it possible to produce preforms for bellow, that is performs having a relatively high number of enlarged wall thickness changes per unit of length, with an increased precision.

SUMMARY OF THE INVENTION

This and other objects of the invention are achieved by providing an apparatus in which, according to the invention, both control devices are associated with computer operable during lifting of the collar die to produce a bellows, which computer is provided with a program for producing a required cross-section along the length of the manufacturing preform in accordance with displacement of the collar die during its lifting. According to the invention, the collar die is connected with a continuously functioning displacement measuring device that is connected, in turn, with the computer. The increase in speed during lifting of the collar die is controlled. Also during movement of the collar die an oscillating larger and smaller controlled gap cross-section is conformed to continuously controlled speed rate of the collar die, so that the thickness of the wall of the produced perform is changed, in a wave-like manner, from valleys to peaks.

The displacement of the collar die of the drawing device is continuously measured and, dependent on respective positions of the collar die, two values, gap width and drawing speed, are adjusted by the computer. The displacement measuring devices according to the invention permit to produces bellows or their preforms with an increased precision, as a rule, from a thermoplastic material. It is important to be able to change the gap width frequently when the drawing speed is relatively constant. The collar die is displaced with a speed that is controlled from the very beginning. This permits immediate conforming of the thickness of the preform to the collar die displacement. The gap width change is programmed in accordance with a speed rate which remains constant during displacement of the collar die along a programmed path. The apparatus according to the invention operates in accordance with PRESS-BLOWER process.

The oscillation of the gap width is conformed to a constant speed rate, that is to a constant speed of the reciprocating, movable in opposite direction, collar die. The valleys and peaks of the wave-shaped (e.g., sinusoidal wave) or arcuate thickness of the perform wall are defined, dependent on the path of drawing, by the gap width. Because the bellows cross-section of a to-be-produced bellows is known, the wave form of the wall cross-section of the perform can be defined. The profile precision of a bellows, which is produced in an apparatus according to the invention, in the longitudinal direction and the circumferential precision are improved because the perform is drawn strictly between a centered tubular die and the collar die. In view of the required increased precision, both drives in the apparatus according to he invention, as a rule, are hydraulic drives with control valves. The invention relates not only to apparatus for manufacturing preforms for hollow bodies but also to a method of manufacturing same in a particular apparatus operable in accordance with a predetermined computer program. In this respect, the invention relates to a method of producing a tubular preform having a variable cross-section along its length for blow molding of bellows from a thermoplastic material. According to the inventive method, the plastic material is injected into a recess of a collar die sitting on a tubular die, and the preform is produced upon lifting of the collar die of the tubular die. The preform is formed in such a way that thickness of the preform wall changes in a wave-like manner, with valleys and peaks. The inventive method makes use of an apparatus in which the control device for a drive for displacing the collar die toward and away from the tubular die, and the control device for a drive effecting the flow of plastic material from the tubular die, are both operable during lifting of the collar die of the tubular die. The drive for effecting the flow of plastic material is operable to change the width of the exit opening or gap of the tubular die. During lifting of the collar die of the tubular die, the speed of the collar die increases from zero on. During further displacement of the collar die away form the tubular die, the control devices are actuated and operate, dependent on the collar die displacement. The collar die is connected with a continuously operable displacement position measuring device, which is connected to a computer operable during lifting of the collar die and connected with both control devices. To enable manufacturing of a preform having a cross-sectional profile along its length corresponding to that of a to-be-produced bellows-hollow body, the computer is provided with a program based on the displacement path of the collar die. The lifting speed of the collar die is constantly controlled. During lifting of the collar die, the oscillating larger or smaller gap width is controlled so as to conform to the continuously controlled speed ratio of the collar die.

Advantageously, the displacement measuring device comprises an ultrasound position sensor including a position indicating movable ring magnet in which a measuring tube extends. The measuring tube encompasses a measuring wire and is associated as with an electrical pulse sender so with an ultrasound pulse receiver. This, per se known, measuring device functions in contactless manner, is wear-free, has a high resolution, and is not subjected to soiling.

The bellows has five pleats, so that, correspondingly, the oscillating larger and smaller gap width, upon lifting of the collar die, form at least six elevations of wall thickness and six indentations of the wall thickness.

The position measuring device and the computer enable a very fine control. Advantageously, the oscillating larger and smaller gap widths are controlled in accordance with a straight bevel. Thinning and thickening of the preform cross-section correspond to varying of the gap width along the straight bevel. Thus, during manufacturing of the preform not only arcuate waves are produced, but also thickness increase or decrease is effected in accordance with correspondingly short straight bevels. The axial length of such a bevel should insure a predetermined distance between pleat peaks and pleat valley of the bellows produced from the preform.

The bellows produced from a preform, which is manufactured according to the invention, can be used for different applications. Use of the apparatus and method according to the invention is especially advantageous for producing axle cups for motor vehicles. The axle cups are provided, e.g., for semiaxles of drive axles. For this use, the advantage consists not only in that the bellows, produced in a preform according to the invention, is made of a thermoplastic material, but also in that the end pieces are produced with high precision required by the axle cups.

The apparatus according to the invention enables to effect a large number of wall thickness changes having large radial dimensions with an increased precision. This is achieved by providing in the tubular die an axially displaceable die torpedo for changing the gap width and/or when a plastic material is ejected from the tubular die by using a pressure piston, movable along a straight line, an a control device for controlling the pressure piston drive for changing the pressure speed drive.

It is especially advantageous when the tubular die is connected with a continuously operating displacement measuring device which is connected with the computer and the die torpedo drive, and/or when the pressure piston is connected with a displacement measuring device, which is connected with a computer and operates in accordance with pressure piston displacement. A respective displacement measuring device comprises, preferably, an ultrasound position sensor comprising a movable position indicator-ring magnet which surrounds a measuring tube encompassing a measuring wire and associated as with a pulse sender so with an ultrasound pulse receiver. All three position measuring devices, used in the apparatus according to the invention, measure the correcting variables of the apparatus, necessary for appropriate shaping of a preform, with an ultrasound position sensor. These measuring devices are controlled by the computer. That permits to achieve an increased precision in measurement.

BRIEF DESCRIPTION OF THE DRAWINGS

The objects and features of the present invention and the manner of attaining them will become more apparent and the invention itself will by best understood from the following detailed description of the preferred embodiment read with reference to the accompanying drawings, wherein.

DETAILED DESCRIPTION OF THE PREFERRED EMBODIMENT

Figure 1:
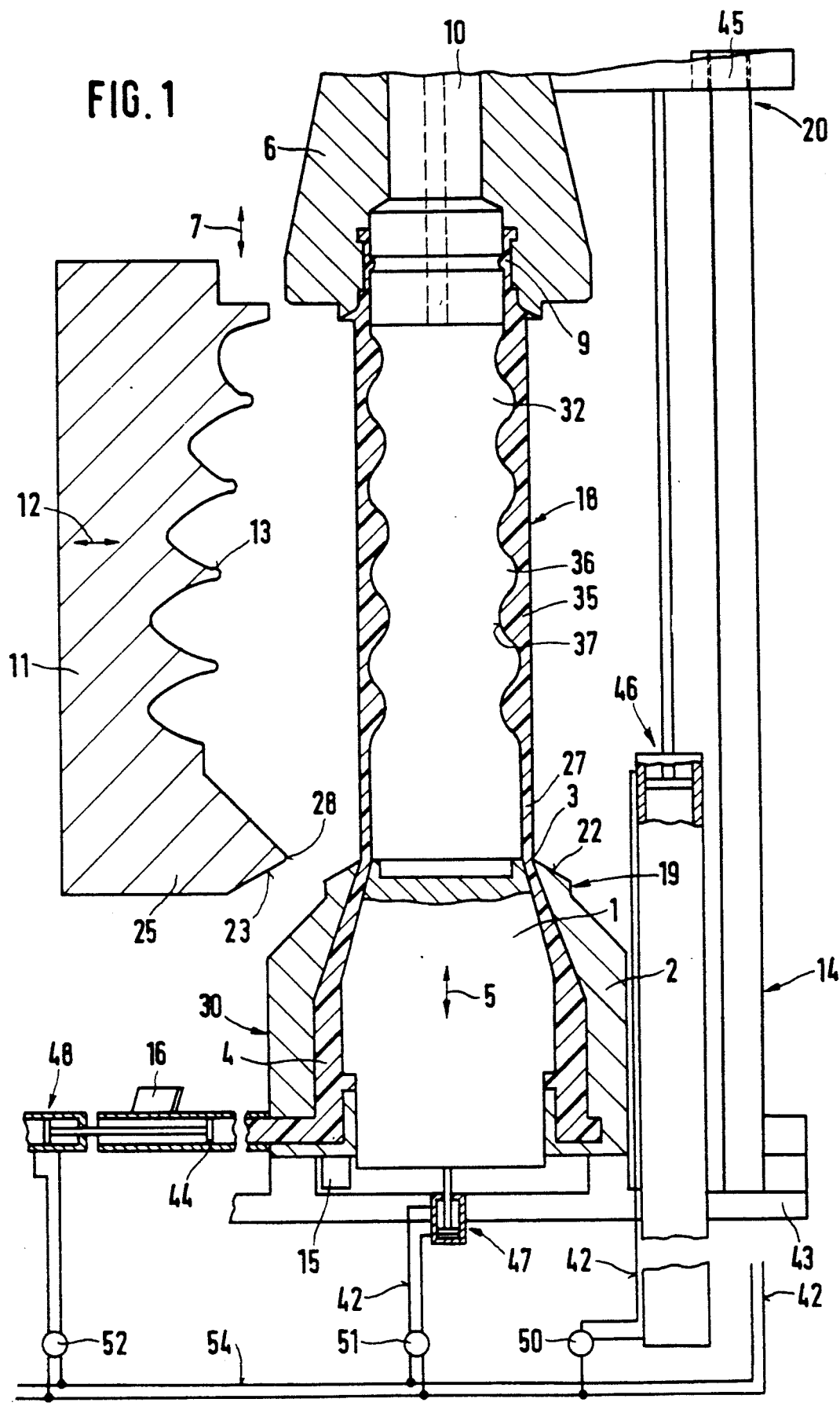
FIG. 1 shows a cross-sectional view of an apparatus for manufacturing a preform for blow molding of a bellows.
Figure 4:
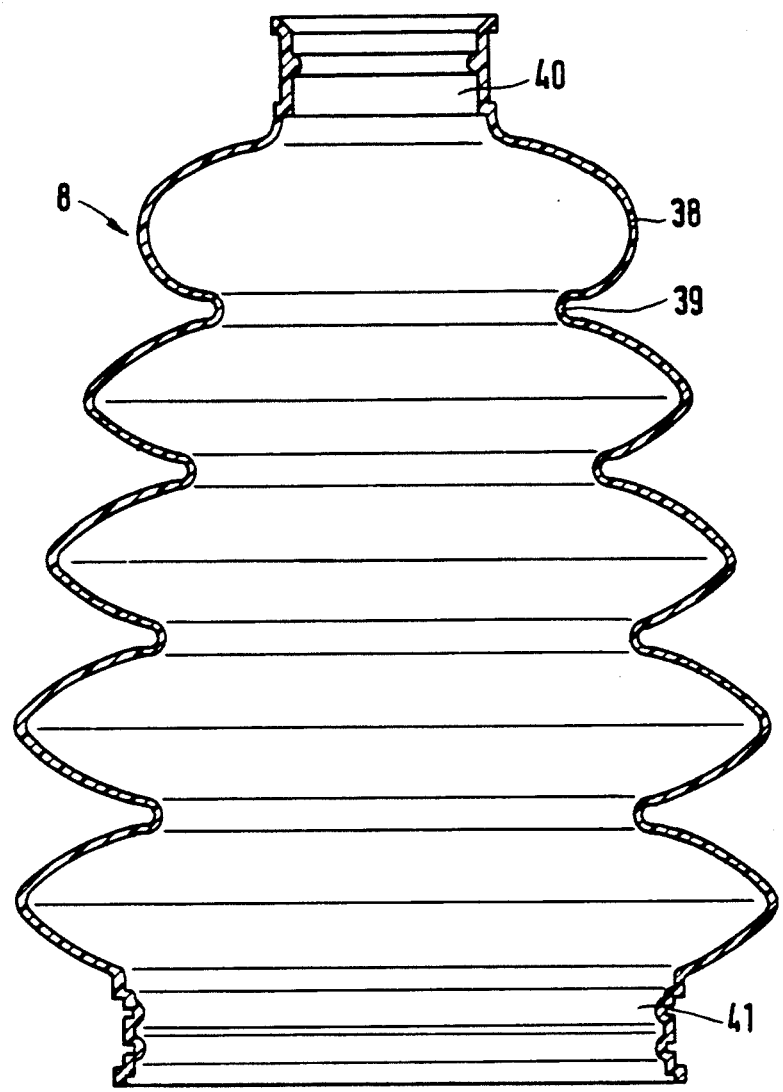
FIG. 4 shows a cross-sectional view of a bellows produced in a preform obtained with the apparatus shown in FIG. 1.
Figure 2:
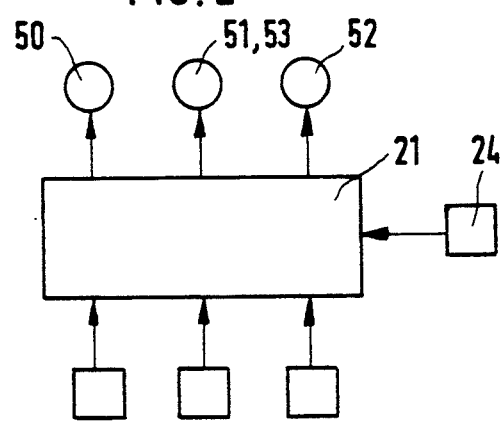
FIG. 2 shows a diagrammatic view of a control device for the apparatus shown in FIG. 1.

An apparatus for manufacturing preforms for blow molding of bellows shown in FIG. 1 comprises a tubular die 30 which is shown in the lower portion of the drawing. The tubular die 30 is formed of a die torpedo 1 and a die land 2 that concentrically surrounds the die torpedo 1. The die torpedo 1 and the die land 2 form together an upper annular exit opening 3 through which plastic material is delivered. While the die land 2 is stationary, the die torpedo 1 is reciprocable in the directions indicated by arrow 5. Opposite the tubular die 30, there is provided a drawing device, also called a collar die 6, (injection die), movable in the directions indicated by arrow 7. The collar die 6 has a recess 9 facing downward and which passes into the exit opening 3 when the collar die 6 sits on the tubular die 30. The recess 9 encompasses an end portion of a blow mandrel 10. Reference numeral 11 designates a blow half-mold of a blow mold which closes or opens in accordance with reciprocal movement of the half-molds in the horizontal directions indicated by arrow 12. The blow mold has an inner profile 13. The profile 13 corresponds to the outer profile of a bellows 8, shown in FIG. 4, when the blow mold is closed.

When the collar die is lowered and sits on the tubular die 30, and the blow needle engages the center region of the die torpedo 1, a collar 17 of a plastic material is formed in the recess 9. Upon movement of the collar die 6 upward on injection of the plastic material through the exit opening 3, a preform 18 is formed. The start 19 is of this preform 18 produced when the collar die 6 sits on the tubular die 30. The end 20 of this preform manufacturing is produced when the collar die 6 is in its upper position shown in FIG. 1.

The die land 2 has, in its upper region, a bevel 22, which is engageable by respective bearing surfaces 23 of the blow half-molds 11 upon closing of the blow mold. The bearing surface 23 is provided on a shoulder 25. The shoulders 25 of the two blow half-molds 11 are displaced toward the bevel 23 upon closing of the blow mold. Upon closing of the blow mold, the preform is blown to its final shape. Because the annular preform is formed as a andulated piece, the plastic material extends uniformly in the circumferential direction. Therefore, the waste is smaller than with extrusion blow molding. The blow half-molds are displaced on horizontal rails (not shown) supported on a post. This post also supports the blow mold displacing devices each of which includes a double-acting cylinder-piston arrangement acting on a respective blow half-mold. The double-acting cylinder-piston arrangements are connected by appropriate conduits with a source of a pressure fluid. FIG. 1 shows a support 43 that supports a drive 46 that acts on a projection 45 for displacing the collar die 6. The drive 46 is likewise formed as a cylinder-piston arrangement which is fed with pressure fluid through a respective conduit 42.

The support 43 also supports a drive 47 which comprises two cylinder-piston arrangements acting on the die torpedo 1. These two cylinder-piston arrangements are likewise fed with pressure fluid through respective conduits 42. There is further provided a pressure piston 44 on which a drive 48 acts. The pressure piston 44 serves for delivering the plastic material 4 in the direction toward the exit opening 3. The conduits 42 discharge into control valves 50, 51 and 52, which not only control the flow of pressure fluid to and from respective cylinder-piston arrangements but also control the amount of pressure fluid that passes therethrough in a unit of time. The control valves 50, 51 and 52 communicate with a main conduit 54 connected to the source of pressure fluid. The collar die 6, the die torpedo 1, and the pressure piston 44 are associated, respectively, with displacement measuring devices 14, 15 and 16, which are shown in FIG. 1 only schematically. The position measuring devices 14, 15 and 16 are connected to a computer 21. The computer 21 is connected with a storage 24 in which a program for manufacturing a bellows or corresponding to the bellow preform, is stored. The computer 21 adjusts operation of valves 50, 51 and 52 in accordance with the program and data received from the displacement measuring devices 14, 15 and 16.

Figure 3:
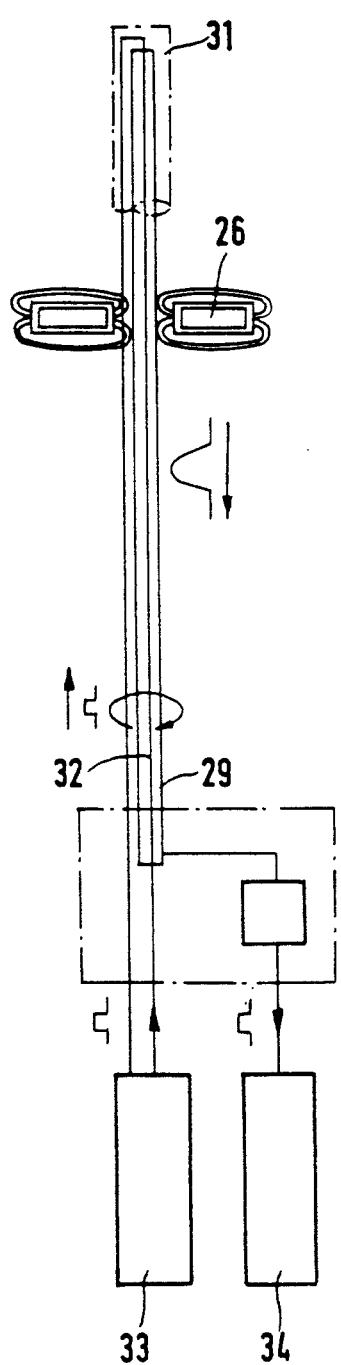
FIG. 3 shows a schematic view of a displacement measuring device for the apparatus shown in FIG. 1.

The three displacement measuring devices 14, 15 and 16 are shown with more details in FIG. 3. Each displacement measuring device is formed as an ultrasound position sensor. It includes a movable permanent ring magnet 26, connected with a movable part whose displacement or position relative to an initial or zero point is to be measured. The ring magnet 26 includes a stationary ferromagnetic measuring tube 29. The measuring tube 29 is connected, at one end thereof, to a sound absorber 31, and encompasses a measuring wire 32, which is connected at an end thereof opposite to the one end of the measuring tube 29, to an electrical pulse sender 33. Electrical pulses are run along the wire 32 under action of circular magnetic field until the magnetic field strikes the ring magnet 26 which, in response to being striked by the magnetic field, generates a sound pulse which is absorbed by the ultrasound pulse receiver 34. The time span between the sending of the electrical pulse by the pulse sender 33 and receiving the sound pulse by the pulse receiver 34 is a measure of the position of the movable part of the ring magnet 26.

The finished preform 18 has, e.g., as shown in FIG. 1, along its length, six swellings 35 of the wall cross-section, which extend from a section 36 through the peak 37 to a valley and give the cross-section altogether a wave-like configuration. A bellows produced from the preform 18 has projecting pleats 38 separated by projecting inward constriction 39. The bellows has two end portions 40 and 41, the inner dimensions of which are produced with a high precision.

While a particular embodiment of the invention has been shown and described, various modification thereof will be apparent to those skilled in the art and, therefore, it is not intended that the invention be limited to the disclosed embodiment or to the details thereof, and departures may be made therefrom within the spirit and scope of the invention as defined in the claims.

What is claimed is:

1. An apparatus for manufacturing a tube-like preform having a longitudinal wall with a variable cross-section for flow molding of a hollow body from a thermoplastic material, said apparatus comprising:

a tubular die having an exit opening with a variable cross-section;

a collar die having a recess, said collar die being movable into engagement with and away from said tubular die, the thermoplastic material being injected through said exit opening of said tubular die into said recess of said collar die when said collar die sits on said tubular die, and the preform being manufactured upon movement of said collar die away form said tubular die;

first drive means for moving said collar die into engagement with and away from said tubular die;

second drive means for varying the cross-section of said exit opening of said tubular die;

first control means for controlling operation of said first drive means; and second control means for controlling operation of said second drive means;

wherein said first control means and said second control means are actuatable during movement of said collar die away from said tubular die, and are operable in accordance with displacement paths of said collar die and said second drive means;

wherein said first control means and said second control means are associated with computer means, constantly operable during movement of said collar die away from said tubular die, for producing the preform, said computer means being connected with storage means containing a program for forming the variable cross-section of the wall of the preform along its entire longitudinal extent in accordance with a displacement path of said collar die when it moves away from said tubular die, whereby a speed of movement of said collar die away from said tubular die, which increases from a zero value, is continuously controlled, and oscillations of larger and smaller cross-sections of said exit opening of said tubular die are controlled in accordance with a continuously controlled speed rate of the movement of said collar die away from said tubular die, so that a thickness of the wall of the produced preform changes from peaks to valleys in a wave-like manner to form the variable cross-section of the wall; and wherein said first control means comprises a continuously operable first displacement measuring device for determining positions of said collar die and connected with said computer means, said first displacement measuring device comprising an ultrasound position sensor including a movable position indicator-ring magnet, a measuring tube encompassing a measuring wire and associated with an electrical pulse sender and an ultrasound pulse receiver.

2. An apparatus for manufacturing a tube-like preform having a longitudinal wall with a variable cross-section for blow molding of a hollow body from a thermoplastic material, said apparatus comprising:

a tubular die having an exit opening with a variable cross-section;

a collar die having a recess, said collar die being movable into engagement with and away from said tubular die, the thermoplastic material being injected through said exit opening of said tubular die into recess of said collar die when said collar die sits on said tubular die, and the preform being manufactured upon movement of said collar die away form said tubular die;

first drive means for moving said collar die into engagement with and away from said tubular die;

second drive means for varying the cross-section of said exit opening of said tubular die;

first control means for controlling operation of said first drive means; and second control means for controlling operation of said second drive means;

wherein said first control means and said second control means are actuatable during movement of said collar die away from said tubular die, and are operable in accordance with displacement paths of said collar die and said second drive means;

wherein said first control means and said second control means are associated with computer means, constantly operable during movement of said collar die away from said tubular die, for producing the preform, said computer means being connected with storage means containing the program for forming the variable cross-section of the wall of the preform along its entire longitudinal extent in accordance with a displacement path of said collar die when it moves away from said tubular die, whereby a speed of movement of said collar die away from said tubular die, which increases from a zero value, is continuously controlled and oscillations of larger and smaller cross-sections of said exit opening of said tubular die are controlled in accordance with a continuously controlled speed rate of the movement of said collar die away from said tubular die, so that a thickness of the wall of the produced preform changes from peaks to valleys in a wave-like manner to form the variable cross-section of the wall;

wherein said tubular die includes an axially adjustable die torpedo for changing the cross-section of said exit opening of said tubular die, said second drive means driving said torpedo;

and wherein said second control means comprises a second continuously operable displacement measuring device for determining positions of said second drive means and connected with said computer means, said second displacement measuring device comprising an ultrasound position sensor including a movable position indicator-ring magnet, a measuring tube encompassing a measuring wire and associated with an electrical pulse sender and an ultrasound pulse receiver.

3. An apparatus for manufacturing a tube-like preform having a longitudinal wall with a variable cross-section for blow molding of a hollow body from a thermoplastic material, said apparatus comprising:

a tubular die having an exit opening with a variable cross-section;

a collar die having a recess, said collar die being movable into engagement with and away from said tubular die, the thermoplastic material being injected through said exit opening of said tubular die into said recess of said collar die when said collar die sits on said tubular die, and the preform being manufactured upon movement of said collar die away form said tubular die;

first drive means for moving said collar die into engagement with and away from said tubular die;

second drive means for varying the cross-section of said exit opening of said tubular die;

first control means for controlling operation of said first drive means; and second control means for controlling operation of said second drive means;

wherein said first control means and said second control means are actuatable during movement of said collar die away from said tubular die, and are operable in accordance with displacement paths of said collar die and said second drive means;

wherein said first control means and said second control means are associated with computer means, constantly operable during movement of said collar die away from said tubular die, for producing the preform, said computer means being connected with storage means containing a program for forming the variable cross-section of the wall of the preform along its entire longitudinal extent in accordance with a displacement path of said collar die when it moves away from said tubular die, whereby a speed of movement of said collar die away from said tubular die, which increases from a zero value, is continuously controlled and oscillations of larger and smaller cross-sections of said exit opening of said tubular die are controlled in accordance with a continuously controlled speed rate of the movement of said collar die away from said tubular die, so that a thickness of the wall of the produced preform changes from peaks to valleys in a wave-like manner to form the variable cross-section of the wall;

and wherein said apparatus further comprises a pressure piston movable along a straight line for pressing the thermoplastic material through said exit opening of said tubular die; and third drive means for displacing said pressure piston; third control means for controlling operation of said third drive means for changing a displacement speed of said pressure piston said third control means comprising a third continuously operable displacement measuring device for determining positions of said pressure piston and connected with said computer means, said third displacement measuring device comprising an ultrasound position sensor including a movable position indicator-ring magnet, a measuring tube encompassing a measuring wire and associated with an electrical pulse sender and an ultrasound pulse receiver.

4. An apparatus for manufacturing a tube-like preform having a longitudinal wall with a variable cross-section for blow molding of a bellows from a thermoplastic material, said apparatus comprising:

a tubular die having an exit opening with a variable cross-section;

a collar die having a recess, said collar die being movable into engagement with and away from said tubular die, the thermoplastic material being injected through said exit opening of said tubular die into said recess of said collar die when said collar die sits on said tubular die, and the preform being manufactured upon movement of said collar die away form said tubular die;

first drive means for moving said collar die into engagement with and away from said tubular die;

second drive means for varying the cross-section of said exit opening of said tubular die;

first control means for continuously controlling operation of said first drive means;

second control means for continuously controlling operation of said second drive means; and computer means for continuously controlling a speed of said first drive means and displacement of said second drive means in accordance with operation of said first control means and said second control means and in accordance with a program, which controls forming the cross-section of the wall of the preform along its entire longitudinal extent in accordance with the displacement path of said collar die when it moves away from said tubular die, in such a manner that oscillations of larger and smaller cross-sections of said exit opening of said tubular die correspond to a continuously controlled speed rate of the movement of said collar die so, that a thickness of the wall of the produced preform changes from peaks to valleys in a wave-like manner to form the variable cross-section of the wall.

5. An apparatus as set forth in claim 4, wherein said controlled oscillating larger and smaller cross-sections of said exit opening, during movement of said collar die away from said tubular die, lead to formation of at least six thickness peaks and thickness valleys in the cross-section of the wall of the manufactured preform.

6. An apparatus according to claim 4, wherein said controlled oscillating larger and smaller cross-sections of said exit opening of said tubular die are controlled in accordance with a straight bevel section.

7. An apparatus according to claim 4, wherein the manufactured preform is used for manufacture of an axle cup of a motor vehicle.

* * * * *